United States Patent [19]

Hamburg

[11] Patent Number: 5,177,464
[45] Date of Patent: Jan. 5, 1993

[54] CATALYST MONITORING USING A HYDROCARBON SENSOR

[75] Inventor: Douglas R. Hamburg, Birmingham, Mich.

[73] Assignee: Ford Motor Company, Dearborn, Mich.

[21] Appl. No.: 754,778

[22] Filed: Sep. 4, 1991

[51] Int. Cl.⁵ .............................................. B60Q 1/00
[52] U.S. Cl. .................................. 340/439; 340/438; 340/633; 60/277
[58] Field of Search ...................... 340/439, 438, 633; 73/118.1; 364/431.03; 60/276-278

[56] References Cited

U.S. PATENT DOCUMENTS

| | | | |
|---|---|---|---|
| 3,801,973 | 4/1974 | Grabiel et al. | 340/633 |
| 3,938,075 | 2/1976 | Reddy . | |
| 3,962,866 | 6/1976 | Neidhard et al. | 60/276 |
| 3,969,932 | 7/1976 | Rieger et al. | 60/277 X |
| 3,998,095 | 12/1976 | Tinkham et al. . | |
| 4,007,589 | 2/1977 | Neidhard et al. | 60/276 |
| 4,116,053 | 9/1978 | Blanke . | |
| 4,149,408 | 4/1979 | Ezoe et al. | 73/118.1 |
| 4,167,925 | 9/1979 | Hosaka et al. | 60/276 X |
| 4,175,427 | 11/1979 | Blanke . | |
| 4,884,066 | 11/1989 | Miyata et al. | 340/633 |

Primary Examiner—Jin F. Ng
Assistant Examiner—Christine K. Oda
Attorney, Agent, or Firm—Joseph W. Malleck; Roger L. May

[57] ABSTRACT

An on-board monitoring system for an automotive emission catalyst has (i) a test chamber remote from the automobile's engine exhaust gas stream; (ii) apparatus for supplying the chamber with sampled exhaust gases sequestered from the stream; (iii) a single hydrocarbon sensor exposed to the exhaust gas in the chamber to render a signal responsive to the concentration of hydrocarbon in the chamber; and (iv) apparatus for comparing the sensed signal with a reference signal, and, if a predetermined difference is exceeded, the catalyst is indicated as faulty. Apparatus (ii) has a supply channel interconnected between the chamber and the gas stream upstream of the catalytic converter, a supply channel independently interconnected between the chamber and the gas stream downstream of the catalytic converter, and valve apparatus for permitting flow-through of no more than one channel to the chamber at any one moment, preferably cycled at a certain frequency. Method steps carried out by the system comprise: (a) periodically transferring a sample quantity of gas from the stream into a test chamber at a predetermined flow rate; (b) exposing a hydrocarbon sensor to the sequestered gas to generate a signal in proportion to the content of hydrocarbon in such gas; and (c) comparing the signal with a reference signal to determine if a predetermined difference exists and thereby conclude the catalyst is sufficiently degraded.

8 Claims, 4 Drawing Sheets

CATALYST MONITORING USING A HYDROCARBON SENSOR

BACKGROUND OF THE INVENTION

1. Technical Field

This invention relates to the technology of detecting degradation of catalytic converters used to modify the emissions of an automotive internal combustion engine, and more particularly to systems, using such technology, contained on-board an automotive vehicle.

2. Discussion of the Prior Art

A monitoring system, often referred to as OBD II, has been mandated by the State of California to cover catalytic converters on all vehicles starting in 1994. This law requires that the monitoring system detect when the catalytic converter has dropped essentially below 50% in conversion efficiency for hydrocarbons in the exhaust gas.

Prior art approaches to meeting such mandate have focused on the use of oxygen sensors [as discussed in copending U.S. patent application Ser. No. 07/741,881, assigned to the assignee of this invention] to provide a signal that corresponds with the oxygen storage capability of the catalytic converter. In such prior art, it is presumed that there is a correlation between catalyst oxygen storage, sensed signal features, and catalyst performance; often there is no such correlation.

The author herein is not aware of any prior application of hydrocarbon sensors to an on-board monitoring system of an automotive vehicle for monitoring the efficiency of its catalytic converter and thereby meet such mandate. However, hydrocarbon sensors have been used heretofore in large scale testing, such as for smoke stacks, to give an indication of the hydrocarbon content.

In hydrocarbon sensors known to the prior art, either conductivity or calorimetry can form the basis for providing a signal. In a semiconductor hydrocarbon sensor device, a material absorbs combustible gases (hydrocarbons and/or CO), which absorption changes the material's conductivity and thus provides an indication of the hydrocarbon in the gas to which it is exposed. In a calorimetric device, thermocouples are deployed on a divided sensor substrate, one portion of which is catalytic. Combustion of the surrounding gas by the catalytic coating will raise the temperature of such portion greater than the temperature of the other portion; comparison of the temperatures of such thermocouples gives a linear indication of the hydrocarbon surrounding such sensor.

It is difficult to apply such prior art hydrocarbon devices to on-board detection requirements for an automotive vehicle because: (i) they possess no reference to evaluate the sensor signal; (ii) the devices are bulky and generally inaccurate; and (iii) they cannot operate at the higher temperatures of automotive exhaust gases or operate continuously.

SUMMARY OF THE INVENTION

In a first aspect, the invention is an on-board monitoring system for an automotive emission catalyst. The apparatus comprises: (i) a test chamber remote from the automobile's engine exhaust gas stream; (ii) means for supplying the chamber with sampled exhaust gases sequestered from said stream; (iii) a single hydrocarbon sensor exposed to the exhaust gas in the chamber to render a signal responsive to the concentration of hydrocarbon in the chamber; and (iv) means for comparing the sensed signal with a reference signal, and, if a predetermined difference is exceeded, the catalyst is indicated as faulty.

Preferably, the means for sequestering has (i) a supply channel interconnected between the chamber and the gas stream upstream of the catalytic converter, (ii) a supply channel independently interconnected between the chamber and the gas stream downstream of the catalytic converter, and (iii) valve means for permitting flow-through of no more than one channel to said chamber at any one moment. The valve means may include a computerized monitoring control module having a routine for alternately opening and closing of such valves at a predetermined frequency. Such predetermined frequency may be in the range of 0.1 to 1.0 Hz. The apparatus may further comprise an electronic engine control module interconnected to the monitoring control module to initiate a catalyst interrogation routine after steady-state conditions and a window of air/fuel, speed/load opportunities are met. The means for comparing may be a computer control that either reads directly the voltage values of the hydrocarbon sensor, which voltage varies with exhaust gas flow rates, or converts to a ratio of voltage values that eliminates variation with flow rate.

It may be advantageous to construct the chamber so that it is effective to store and seal samples for later analysis, the valve means thereby being capable of simultaneously operating to communicate gas samples to each of the separate subchambers. It also may be advantageous to construct the hydrocarbon sensor so that it is of the calorimetric type having a small sensor substrate coated in part with a catalytic material, and thermocouples are connected to each of the portions.

Another aspect of this invention is a method of on-board monitoring of an automotive vehicle catalyst effective to chemically convert a stream of exhaust gases from an internal combustion engine powering such vehicle. The method comprises: (a) periodically transferring a sample quantity of gas from the stream into a test chamber at a predetermined flow rate; (b) exposing a hydrocarbon sensor to the sequestered gas to generate a signal in proportion to the content of hydrocarbon in such gas; and (c) comparing the signal with a reference signal to determine if a predetermined difference exists and thereby conclude the catalyst is sufficiently degraded.

Preferably, the method sequentially supplies exhaust gas to the chamber sequestered from two locations, one upstream and one downstream of the catalytic converter, the supply being arranged so that the chamber essentially contains either exhaust gas from the upstream or from the downstream flow, but not both.

This may be carried out by alternate operation of control valves cyclically opened and closed at a frequency in the range of 0.1 to 1.0 Hz. In cycling the valves for making comparison of signals, it may be desirable to involve observation of a frequency equivalent to the frequency of the valve alternation and observation of the degree of amplitude for each signal. The smaller amplitude would be an indicator of degradation. It is also desirable to convert the voltage signal to a ratio of upstream and downstream voltages so as to eliminate the variability of flow rate.

DETAILED DESCRIPTION AND BEST MODE APPARATUS

Figure 1:
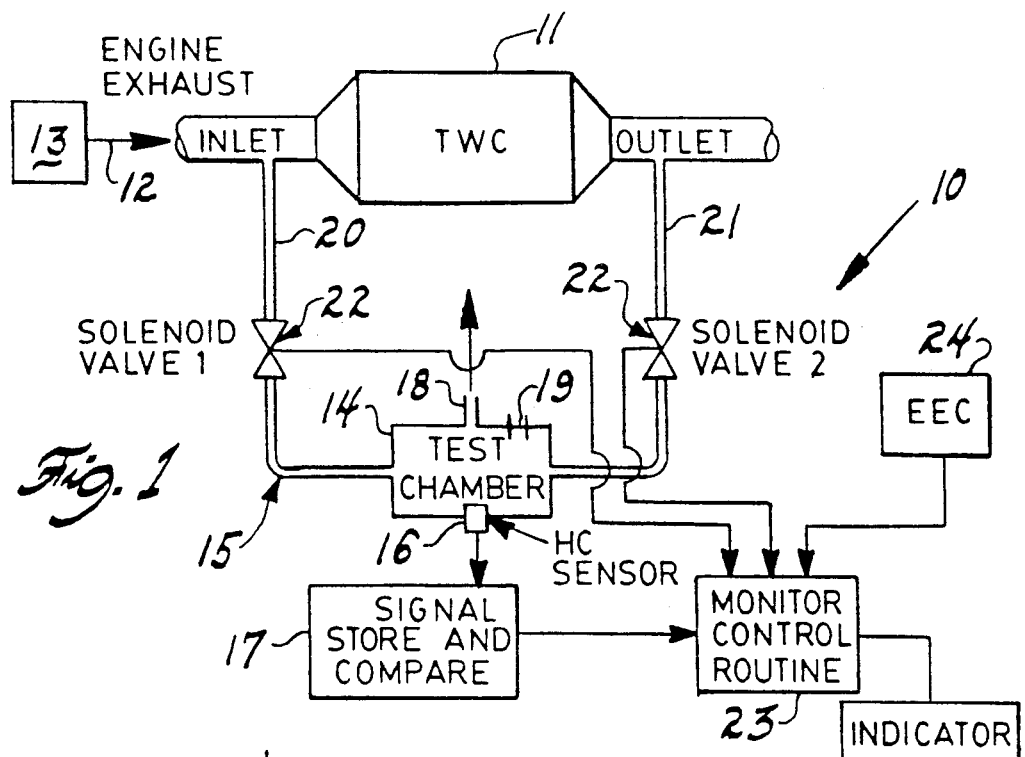
FIG. 1 is a schematic diagram of a preferred on-board monitoring system for a catalyst effective to chemically convert a stream of exhaust gases from an automobile powered by an internal combustion engine.

As shown in FIG. 1, a preferred form of on-board monitoring system 10 for an automotive catalyst 11 capable of converting the emissions 12 from an internal combustion engine 13, comprises essentially a test chamber 14 remote from the exhaust stream 12, means 15 for supplying the chamber 14 with sampled exhaust gases sequestered from the automobile's engine exhaust stream, a single hydrocarbon sensor 16 exposed to the sequestered exhaust gases in the chamber 14 to render a signal responsive to the concentration of hydrocarbon in such chamber, and means 17 for comparing the sensed signal with a reference signal, and if a predetermined difference is exceeded, the catalyst is indicated as faulty.

The means 15 for supplying the chamber 14 particularly comprises a supply channel 20 interconnected between the chamber and the gas stream which is upstream of the catalytic converter, a supply channel 21 independently interconnected between the chamber and the stream which is downstream of the catalytic converter, and valve means 22 for permitting flow-through of no more than one channel to the chamber at any one moment. The valve means 22 may further include a computerized monitoring control module 23 having a routine for alternately opening and closing the valves at a predetermined frequency. Such predetermined frequency may be in the range of 0.1 to 1.0 Hz. The apparatus may further comprise an electronic engine control module 24 interconnected to the monitoring control module 23 to initiate a catalyst interrogation routine after steady-state conditions and a window of air/fuel, speed/load opportunities are met. These conditions are described in the California Air Resources Board (CARB) regulations designated OBD II. The criteria are specified in these regulations, which are incorporated herein by reference.

The test chamber itself should be relatively small, having a volume sufficient to contain the hydrocarbon sensor surrounded by sufficient volume of sequestered exhaust gas so as to function properly. Such volume may be in the range of 0.2 to 1.0 cubic inch.

To provide reliable operation, a single sensor 16 is placed in such chamber so as to eliminate the need for both a hydrocarbon sensor upstream as well as downstream of the catalytic converter, which is costly and leads to durability and reliability problems. The two sensor approach would require that sensor characteristics track over the operating conditions and useful life of the sensors and thereby require some type of jump-back software.

Thus, alternate sampling from upstream and downstream locations communicated to a common test chamber is the approach of this invention Each sample line connects to remotely located solenoids, the output of which would discharge into the small test chamber. The length and design of the sample lines 20, 21 are chosen to provide adequate cooling of the exhaust gas samples to prevent heat damage to the solenoids of the valves and to the hydrocarbon sensor itself.

Although this invention uses a hydrocarbon sensor providing signals for comparison as soon as the interrogation period begins, it also is within the scope of this invention to advantageously construct the chamber so that it is effective to store and seal sequestered gas samples for later analysis, the valve means thereby being capable of *simultaneously* communicating gas samples to each of the separate subchambers without alternative operation of valves.

The hydrocarbon sensor may be of the semiconductor hydrocarbon sensor type having a material that absorbs combustible gases (hydrocarbons and/or CO), which absorption changes the material's conductivity and thus provides an indication of hydrocarbon in the gas to which it is exposed. The sensor may also be of the calorimetric type, wherein thermocouples are deployed on a divided sensor substrate, one portion of which is catalytic. The calorimetric type of hydrocarbon sensor does tend to require excess oxygen to function properly. Since the engine A/F would normally be stoichiometry, the exhaust samples obtained during a catalyst test would not contain sufficient excess oxygen. Thus, if hydrocarbon sensors requiring oxygen were used, it may be necessary to add some air to the test chamber. This could easily be accomplished by connecting the outlet 18 of the test chamber 14 to the engine intake manifold, and then providing a small orifice 19 in the test chamber to admit the necessary air. Combustion of the surrounding gas by the catalytic coating will raise the temperature of such portion greater than the temperature of the other portion; comparison of the temperatures of such thermocouples gives a linear indication of the hydrocarbon surrounding such temperature.

It is important that very low sample flow rates be used for proper operation of the invention. Such flow rates may range from as little as 50 cc/min to 800 cc/min. As a consequence of such low flow rate, deterioration of the hydrocarbon sensor due to the prolonged exposure to exhaust gases will be negligible. The sample flow rate is that which is of the exhaust gas into the test chamber. In practice, the exhaust gas flow rate into the test chamber would be controlled by connecting the outlet of the chamber to the engine intake manifold through a suitable orifice.

The hydrocarbon sensor for this invention would be required to measure fairly low concentrations of hydrocarbon emissions, especially downstream of the catalyst. To increase the hydrocarbon level in the engine exhaust in order to improve the sensor's signal-to-noise ratio, it may be advantageous to advance the spark timing of the engine during the catalyst interrogation test period and simulateneously enrich the engine A/F. The amount of spark advance would be restricted to values which would not cause detonation, the A/F enrichment would be chosen to decrease engine torque just enough to offset any gain in torque caused by the spark advance. Although both of these actions would increase hydrocarbon levels, their use is only recommended if the hydrocarbon sensitivity becomes a serious problem.

The means for comparing 17 may be a computer control that either reads directly the voltage values of the hydrocarbon sensor, which voltage varies with the exhaust gas flow rates, or converts to a ratio of voltage values that eliminates variation with low rate. For follows:

$$\frac{V_{in} - V_{out}}{V_{in}} \times 100 = \text{Sensor Output \%}$$

where $V_{in}$ is voltage of sensor examining upstream gas
$V_{out}$ is voltage of sensor examining downstream gas.

Figures 2, 3:
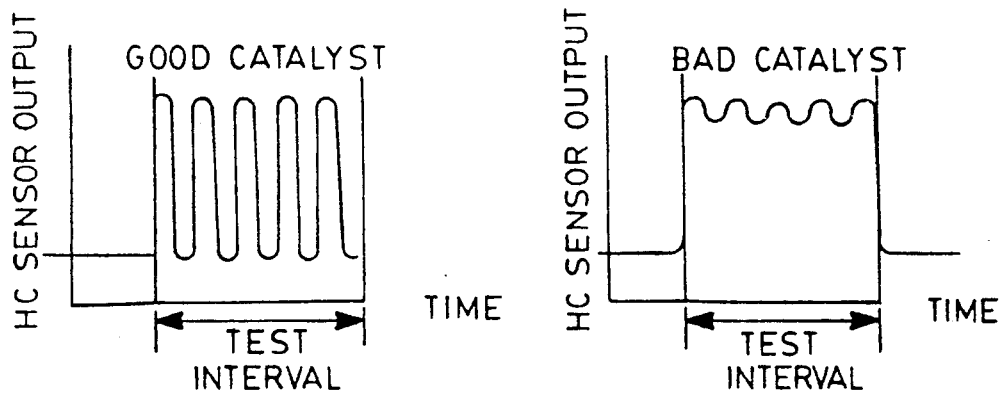
FIGS. 2 and 3 respectively represent graphical illustrations of voltage varying with time, such signals coming from a hydrocarbon sensor in the above system, the first being for a good catalyst and the second being for a degraded catalyst.

If the main catalyst has a high hydrocarbon conversion efficiency, the output of the hydrocarbon sensor downstream of the catalyst compared to the output of the upstream hydrocarbon sensor would fluctuate with a large amplitude at the sampling frequency (see FIG. 2). On the other hand, if the catalyst has a low hydrocarbon conversion efficiency, the output of the hydrocarbon sensor downstream of the catalyst compared to the output of the upstream hydrocarbon sensor would fluctuate with a small amplitude at the sampling frequency (see FIG. 3). The amplitude of the hydrocarbon sensor output fluctuations could be calibrated as a function of the hydrocarbon conversion efficiency of the catalyst (as indicated above), and thus could signal a catalyst malfunction when the amplitude drops below some specified threshold. The sampling frequency for controlling the solenoid valves should be chosen to be consistent with the frequency response of the hydrocarbon sensor as well as with the overall time permitted for the catalyst test. For example, the sampling frequency may typically be about one Hz and the catalyst test period may be relatively short, such as 10-20 seconds during each driving cycle of the vehicle.

Figure 4:
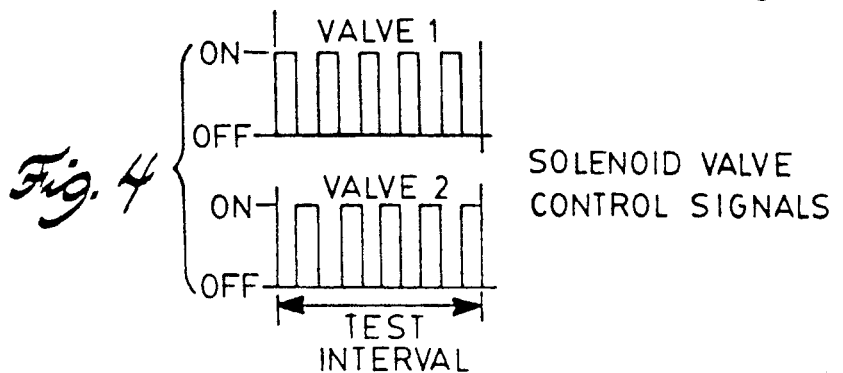
FIG. 4 shows graphical illustrations of the variance of solenoid valve operation comparing visually the operation of first and second valves used in the system of FIG. 1.

The solenoid valve control signals during the alternation may appear as shown in FIG. 4, showing the time alternation for valve 1 and valve 2.

Figure 5:
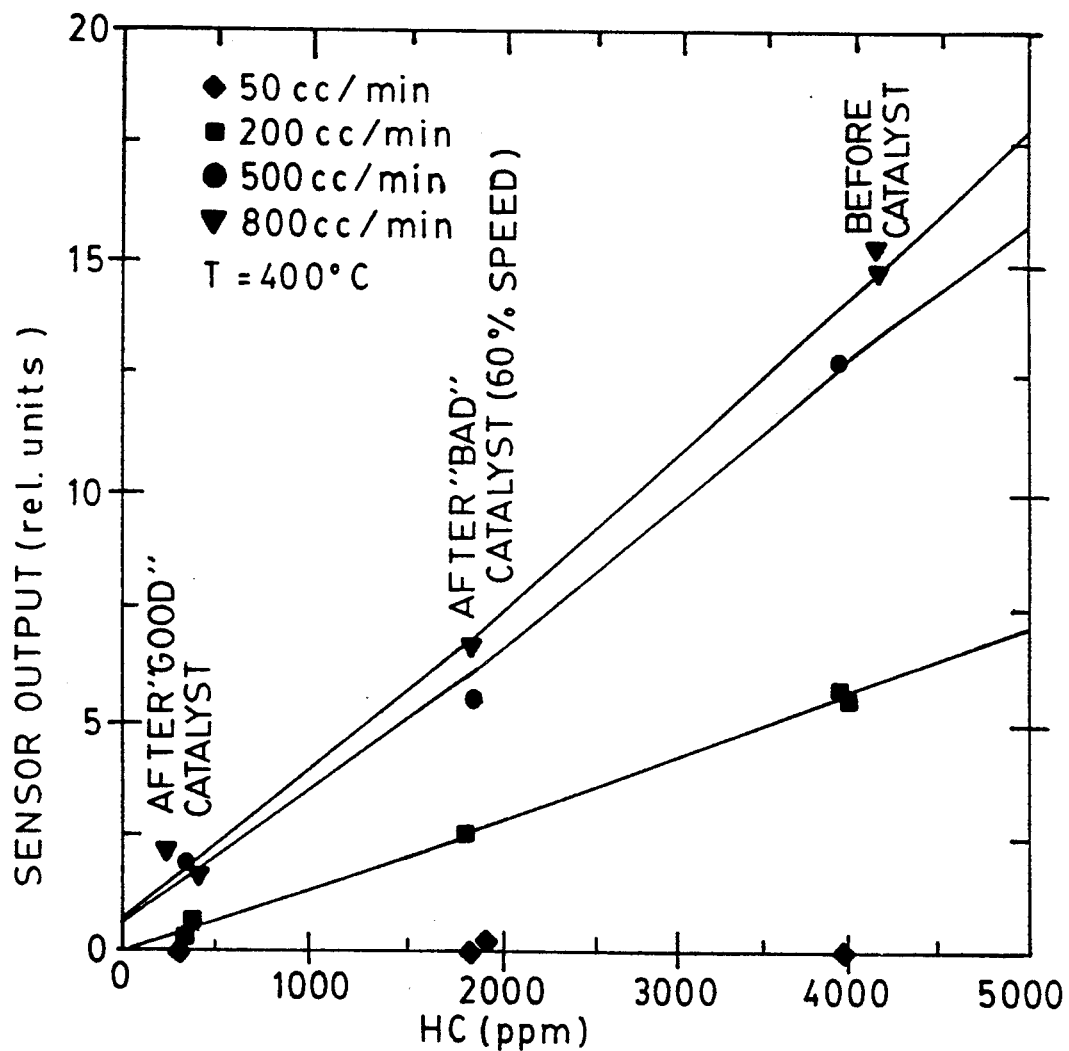
FIG. 5 is a graphical illustration of hydrocarbon sensor voltage as a function of sensed hydrocarbon parts per million.

It has been demonstrated on an engine/dynamometer that a hydrocarbon sensor installed in the test chamber, as suggested herein, can detect hydrocarbon levels before and after both good and bad catalysts. The test data from such demonstration is shown in FIG. 5, wherein a calorimetric type sensor was employed; the exhaust gas was sampled from both before and after the main catalyst converter, the main catalyst converter being in some cases a bad catalyst and in others a good catalyst. The data shows, for various flows from 50 cc/min to 800 cc/min, that the hydrocarbon content varied linearly with the sensor output.

Figure 6:
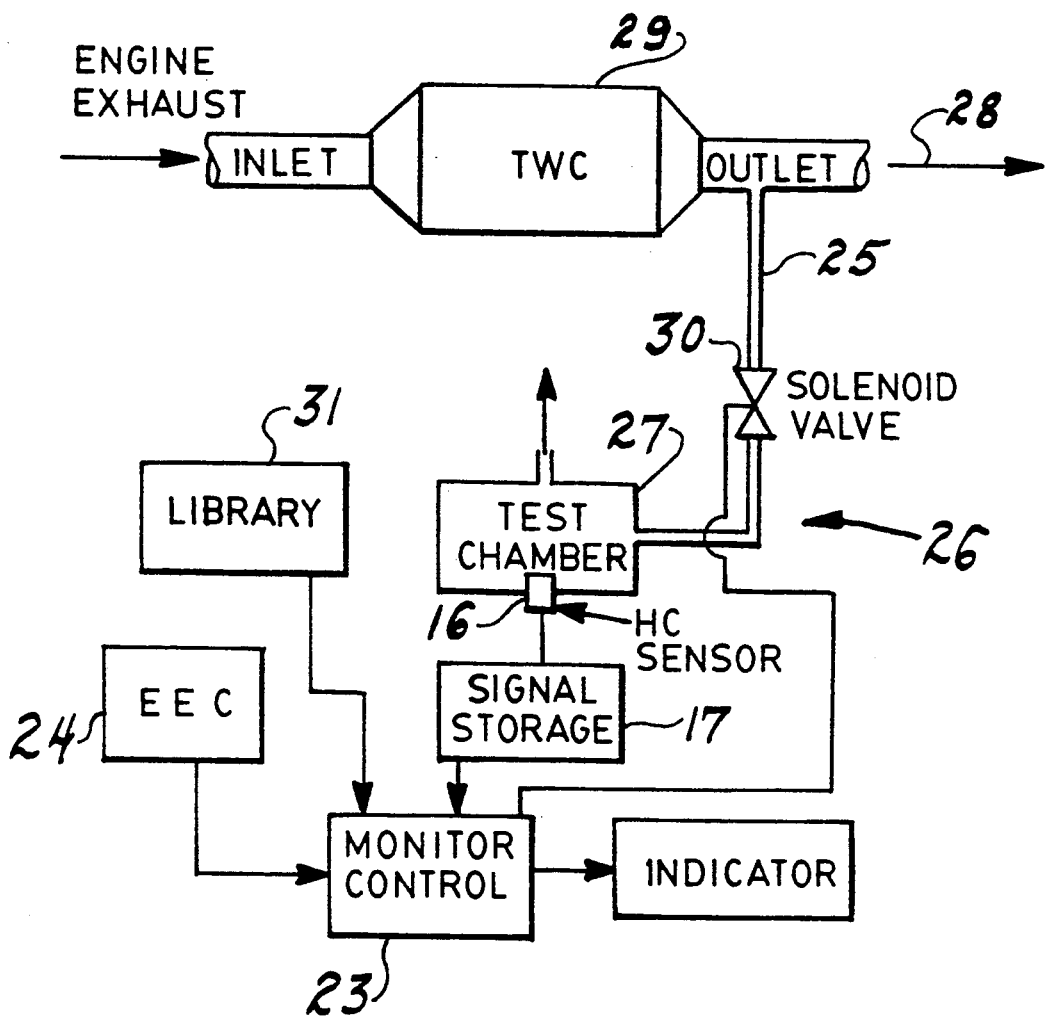
FIG. 6 is an alternative embodiment shown in block diagram similar to that of FIG. 1.

Alternatively, the means for sequestering (see 26 in FIG. 6) may comprise only one supply channel 25 interconnected with the test chamber 27 and the gas stream 28 downstream of the catalyst 29 and the valve 30. There is only one valve for controlling the egress of sequestered flow to the chamber, and the reference signal is one selected from a library 31 of predetermined signal values correlated with engine speed and load for the engine at a predetermined hydrocarbon content.

Method

Figure 7:
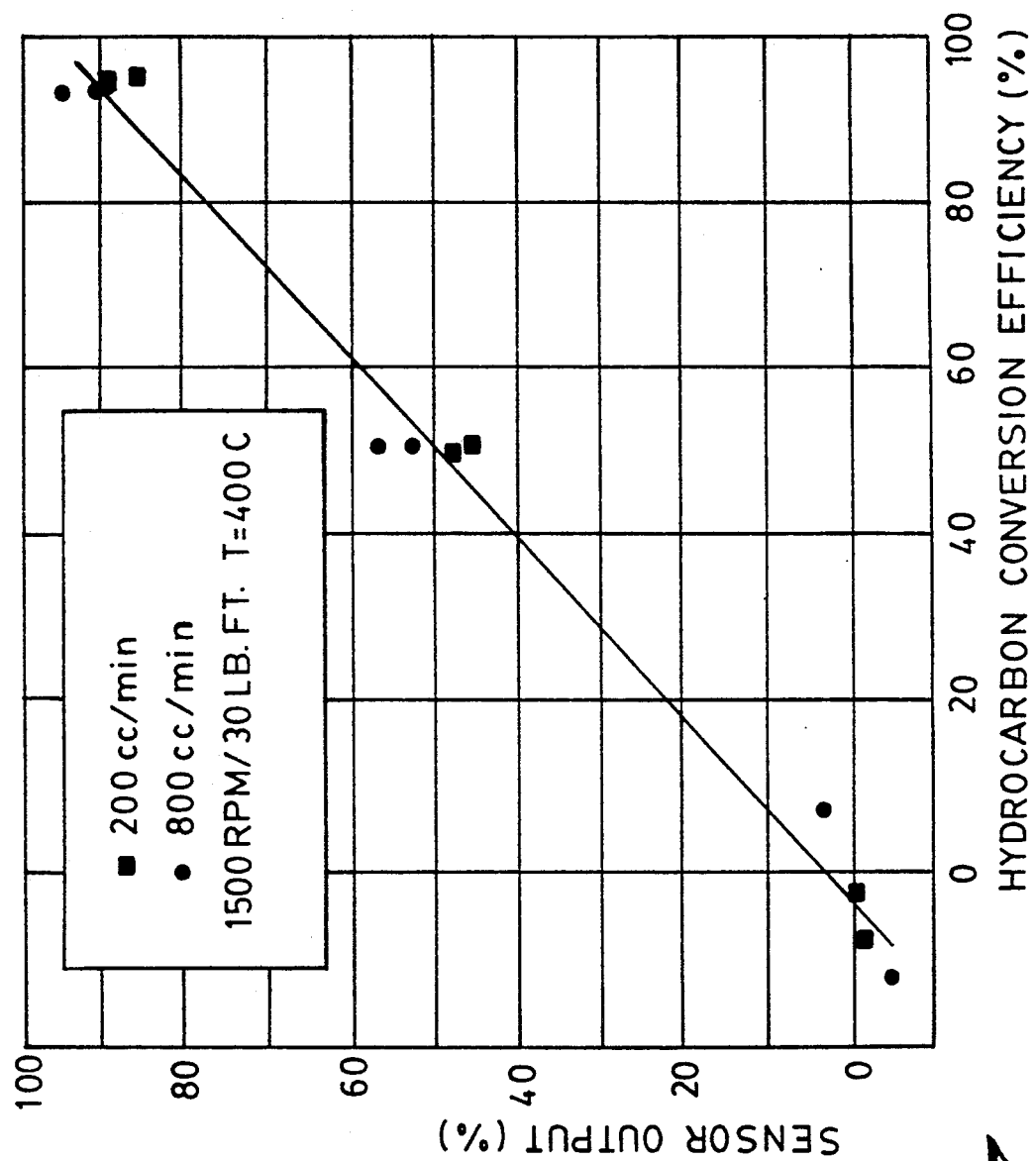
FIG. 7 is a graphical illustration of a percentage ratio of hydrocarbon sensor voltage upstream and downstream which eliminates variations due to flow rate, such ratio being illustrated as a function of catalyst efficiency.

Another aspect of this invention is a method of onboard monitoring of an automotive vehicle catalyst effective to chemically convert a stream of exhaust gases from an internal combustion engine powering such vehicle. The method comprises: (a) periodically transferring a sample quantity of exhaust gas from the stream into a test chamber; (b) exposing a hydrocarbon sensor to the sequestered gas to generate a signal in proportion to the content of hydrocarbon in such gas; and (c) comparing the signal with a reference signal to determine if a predetermined difference exists and thereby conclude the catalyst is sufficiently degraded. The method sequentially supplies exhaust gas to the chamber sequestered from two locations, one upstream and one downstream of the catalytic converter, the supply being arranged so that the chamber essentially contains exhaust gas from either the upstream or the downstream flow, but not both. The method may be carried out by using the signal generator from the sensor exposed to the upstream exhaust gases in the chamber as the reference signal. It is desirable that the flow rate of sequestering be in the range of 50-800 cc/min. It is also desirable that the alternation of the valves to provide signals are alternated at a frequency in the range 0.1 to 1.0 Hz. It is advantageous to repeat interrogation of the monitoring at each change in the driving cycle for the vehicle to accumulate data to render the average difference. The alternation may be carried out by operation of control valves cyclically opened and closed at a frequency in the range 0.1 to 1.0 Hz. In cycling the valves for making comparison of signals, it may be desirable to involve observation of a frequency equivalent to the frequency of the valve alternation and observation of the degree of amplitude for each signal. The smaller amplitude would be an indicator of degradation. It is also desirable to convert the voltage signal to a ratio of upstream and downstream voltages so as to eliminate the variability of flow rate. Such voltage ratio, when plotted against hydrocarbon conversion efficiency, would provide data as that shown in FIG. 7.

The sequence of operating the catalyst monitor control may have the following subroutine of operation: (1) the electronic engine control automatically initiates the catalyst interrogation after certain conditions are met such as steady-state driving, etc.; (2) the upstream valve is opened for a certain period of time such as one second, and the voltage output of the hydrocarbon sensor is stored in a register; (3) the upstream valve is closed and the downstream valve is opened for a certain period such as one second, and the voltage output of the hydrocarbon sensor is stored in another register; (4) steps 2 and 3 may be optionally repeated to give average results; (5) a catalyst monitor control calculates the efficiency from the quantity $$\frac{HC_{upstream} - HC_{downstream}}{HC_{upstream}} \times 100$$

this is compared with a standard to provide an appropriate signal if the difference is greater than 50% (or whatever value is specified by future legislation); and (6)

terminate the test by clearing the registers and closing both valves.

I claim:

1. A method of on-board monitoring of an automotive vehicle catalyst effective to chemically convert a stream of exhaust gases from an internal combustion engine powering said vehicle, comprising:
   (a) periodically transferring a sample quantity of gas, taken from said stream at a location downstream of said catalyst, into a test chamber at a predetermined flow rate;
   (b) exposing a hydrocarbon sensor to said sample quantity of gas to generate a signal in proportion to the content of hydrocarbon in said sample; and
   (c) comparing said signal with a reference signal to determine if a predetermined difference exists and thereby concluding the catalyst is sufficiently degraded, said reference signal being provided by transferring another sample quantity of gas from said stream at a location upstream of said catalyst, into said test chamber at said predetermined flow rate to be exposed to said sensor, said transfer being arranged so that the chamber essentially contains exhaust gas from either the upstream or from the downstream flow, but not both.

2. The method as in claim 1, in which valves are used to control conduits for carrying out transfer of said sampled exhaust gases from said two locations, the valves being operated out of phase so that one will be open when the other is closed.

3. The method as in claim 2, in which said valves are operated cyclically so as to permit the alternation of supply of exhaust gas to the chamber at a frequency of about 0.1 to 1.0 Hz.

4. The method as in claim 1, in which the flow rate for transfer of both said sampled quantities of gas is in the range of 50-800 cc/minute.

5. The method as in claim 1, in which the periodic transferring occurs for a period of about 10-20 seconds to supply the chamber with the gases necessary for comparison.

6. The method as in claim 3, in which steps (a) through (c) are repeated for each change in driving cycle of the engine and said signals accumulated to render an average of said predetermined differences.

7. The method as in claim 3, in which said method further comprises a step to increase the sensitivity of the hydrocarbon sensor to exposure by advancing spark timing of the engine to increase the hydrocarbons in the gas flow while enriching the A/F ratio of the engine to offset any gain in torque by such spark advance.

8. A method of on-board monitoring of a catalyst in an automotive exhaust gas stream having portions upstream and downstream of said catalyst, comprising:
   (a) automatically initiating a monitoring routine after a steady-state driving condition and preselected air/fuel window is obtained;
   (b) operating a valve, controlling transfer of an upstream sample of exhaust gas for a period of time in the range of 1-10 seconds, and storing a voltage output of a hydrocarbon sensor exposed to said upstream sample;
   (c) closing the valve associated with the upstream transfer and opening a valve controlling transfer of a downstream sample of exhaust gas sequestering for a period of time in the range of 1-10 seconds, a voltage output of said hydrocarbon sensor exposed to said downstream sample being stored;
   (d) repeating steps (b) and (c) to give average results;
   (e) calculating the efficiency of the catalyst by taking the quotient of said average results of the stored voltage signal for the upstream gas sample minus the stored voltage signal for the downstream gas sample divided by the stored voltage signal of the upstream gas sample and multiplied by 100; and
   (f) comparing said quotient with an appropriate reference quotient and determining if the difference is greater than 50% thereby indicating that the catalyst is defective to a predetermined degree.

* * * * *